United States Patent
Jo et al.

(10) Patent No.: US 11,462,772 B2
(45) Date of Patent: Oct. 4, 2022

(54) ELECTRODE ASSEMBLY COMPRISING SEPARATOR HAVING INSULATION-ENHANCING PART FORMED ON EDGE PORTION OF ELECTRODE

(71) Applicant: LG Chem, Ltd., Daejeon (KR)

(72) Inventors: Hye Dam Jo, Daejeon (KR); Jong Hun Kim, Daejeon (KR); Hyun Wook Kim, Daejeon (KR); Sang Won Bae, Daejeon (KR); Ji Hee Bae, Daejeon (KR); Jang Hyuk Hong, Daejeon (KR)

(73) Assignee: LG Energy Solution, Ltd.

( * ) Notice: Subject to any disclaimer, the term of this patent is extended or adjusted under 35 U.S.C. 154(b) by 259 days.

(21) Appl. No.: 15/821,327

(22) Filed: Nov. 22, 2017

(65) Prior Publication Data

US 2018/0145376 A1 May 24, 2018

(30) Foreign Application Priority Data

Nov. 24, 2016 (KR) .................. 10-2016-0157238

(51) Int. Cl.
*H01M 10/00* (2006.01)
*H01M 10/42* (2006.01)
(Continued)

(52) U.S. Cl.
CPC ... *H01M 10/4235* (2013.01); *H01M 10/0525* (2013.01); *H01M 10/0585* (2013.01); *H01M 50/46* (2021.01); *H01M 50/461* (2021.01)

(58) Field of Classification Search
CPC ............ H01M 10/4235; H01M 2/168; H01M 10/0525; H01M 2/1673; H01M 50/46;
(Continued)

(56) References Cited

U.S. PATENT DOCUMENTS 9,583,754 B2   2/2017   Obana et al.
2003/0224242 A1*  12/2003   Kaito ............... H01M 2/08
                                                          429/94

(Continued)

FOREIGN PATENT DOCUMENTS

JP          4748136 B2     8/2011
JP        2012-109123 A    6/2012
(Continued)

OTHER PUBLICATIONS

Machine translation of KR 101446160 B1, obtained Dec. 2, 2019 (Year: 2014).*

*Primary Examiner* — Nicholas P D'Aniello
(74) *Attorney, Agent, or Firm* — Lerner, David, Littenberg, Krumholz & Mentlik, LLP

(57) ABSTRACT

An electrode assembly is provided. The electrode assembly has a plurality of electrode plates having one or both sides of each of the electrode plates that are coated with an electrode active material and are stacked with a separator interposed between the respective electrode plates. The separator includes a surplus outer periphery of a size greater than the outer periphery of an electrode plate, an electrode tab which extends from the outer periphery of the electrode plate and protrudes outwardly beyond the outer periphery of the separator is formed on each electrode plate, and at least some of the separators forming the electrode assembly have an insulation-enhancing part for suppressing heat shrinkage of a separator formed in the surplus outer peripheries thereof which are adjacent to the respective electrode tabs.

20 Claims, 5 Drawing Sheets

(51) Int. Cl.
*H01M 10/0525* (2010.01)
*H01M 50/46* (2021.01)
*H01M 10/0585* (2010.01)

(58) Field of Classification Search
CPC .......... H01M 50/461; H01M 10/0459; H01M 10/052; H01M 10/0585; H01M 50/449; H01M 10/0583; H01M 10/058; H01M 2200/10; Y02E 60/10; Y02P 70/50
See application file for complete search history.

(56) References Cited

U.S. PATENT DOCUMENTS

| | | | | |
|---|---|---|---|---|
| 2004/0253512 | A1* | 12/2004 | Watanabe | H01M 50/183 429/210 |
| 2008/0274394 | A1* | 11/2008 | Schormann | H01M 10/0436 429/50 |
| 2009/0317713 | A1* | 12/2009 | Kim | H01M 10/0431 429/164 |
| 2013/0045405 | A1* | 2/2013 | Ahn | H01M 10/0468 429/94 |
| 2014/0242433 | A1 | 8/2014 | Kwon et al. | |
| 2015/0372278 | A1 | 12/2015 | Kakibe et al. | |

FOREIGN PATENT DOCUMENTS

| | | |
|---|---|---|
| JP | 5239302 B2 | 7/2013 |
| KR | 20140009037 A | 1/2014 |
| KR | 10-1446160 B1 | 10/2014 |
| KR | 10-2015-0049973 A | 5/2015 |
| KR | 20150098445 A | 8/2015 |
| KR | 10-1600605 B1 | 3/2016 |

* cited by examiner

ELECTRODE ASSEMBLY COMPRISING SEPARATOR HAVING INSULATION-ENHANCING PART FORMED ON EDGE PORTION OF ELECTRODE

CROSS-REFERENCE TO RELATED APPLICATION

This application claims priority to and the benefit of Korean Patent Application No. 10-2016-0157238, filed on Nov. 24, 2016, the disclosure of which is incorporated herein by reference in its entirety.

TECHNICAL FIELD

The present disclosure relates to an electrode assembly comprising a separator having an insulation-enhancing part formed on an edge portion of an electrode, and more particularly, to an insulation-enhancing part for suppressing heat shrinkage of a separator of the electrode assembly.

RELATED ART

Recently, due to a rapid increase in use of fossil fuels has increased the demand for alternative energy or clean energy. Thus, the field of power generation and electricity storage that uses electrochemical reaction has been actively studied. Secondary batteries are currently used as a representative example of electrochemical devices using electrochemical energy, and the use thereof is increasingly expanding. As technologies for portable devices, (e.g., portable computers, portable phones, cameras, etc.) continue to develop and demand continues to increase, demand for secondary batteries as energy sources is rapidly increasing. Among these secondary batteries, extensive research has been conducted on lithium secondary batteries which have a high charge and discharge capacity and an extended cycle lifespan and which is eco-friendly. Lithium secondary batteries as described are commercially available and widely used.

An electrode assembly disposed in a battery case is a chargeable/dischargeable power generation device having a stacked structure of a cathode/separator/anode. is the electrode assembly is classified into a layer spiral arrangement (e.g., a jelly-roll type) in which long sheet type cathodes and long sheet type anodes are wound in a state in which separators are disposed between each of the cathodes and the anodes, a stacked type in which a plurality of cathodes and anodes each having a predetermined size are sequentially stacked in a state in which separators is disposed between each of the cathodes and the anodes.

Generally, lithium secondary batteries have a structure in which a non-aqueous electrolyte is impregnated into an electrode assembly composed of a cathode that includes a lithium transition metal oxide, an anode that includes a carbonaceous active material, and a porous separator. The cathode is manufactured by coating a cathode mixture comprising a lithium transition metal oxide on an aluminum foil, and the anode is manufactured by coating an anode mixture comprising a carbonaceous active material on a copper foil. However, the lithium secondary batteries are susceptible to being short-circuited due to contact between the cathode and the anode when exposed at a high temperature. Further, when a substantially large current flows in a short time duration due to overcharge, external short circuit, nail penetration, local crush, etc., there is a risk of ignition/explosion as the battery is heated by the generated heat.

In particular, the separator is a microporous membrane formed from a polyolefin resin and has a heat-resistant temperature of about 120 to 160 degrees Celsius. Accordingly, the separator may shrink due to heat generation within the battery, resulting in an increased reaction heat, which may lead to a thermal runaway. This phenomenon mainly occurs at the electrode active material-coated end of the current collector coated with an electrode active material when electrodes are stacked. Various methods for reducing the possibility of a short-cut of an electrode under external impact or high temperature have been considered. However, the demand for securing the safety of a battery has not yet been satisfied. Accordingly, there is a demand for an electrode assembly capable of securing safety while fundamentally solving the above mentioned problems.

The contents described as the related art have been provided merely for assisting in the understanding for the background of the present disclosure and should not be considered as corresponding to the related art known to those skilled in the art.

SUMMARY

The present disclosure provides an electrode assembly having a separator with an insulation-enhancing part formed on an edge portion of an electrode for suppressing heat shrinkage of a separator of the electrode assembly.

In an aspect of an exemplary embodiment of the present disclosure, an electrode assembly may include a plurality of electrode plates with one or both sides of each of the electrode plates coated with an electrode active material, and the electrode plates are stacked with a separator interposed between the respective electrode plates. The separator may include a surplus outer periphery of a size greater than an outer periphery of an electrode plate. An electrode tab may extend from the outer periphery of the electrode plate and may protrude outwardly beyond an outer periphery of the separator to be formed on each electrode plate. A portion of the separators forming the electrode assembly may have an insulation-enhancing part for suppressing heat shrinkage of a separator formed in the outer peripheries thereof which are adjacent to the respective electrode tabs.

In some exemplary embodiments, the insulation-enhancing part may include an insulating coating layer or an insulating adhesive tape for coupling the outer periphery of an electrode plate to the outer periphery of a separator at the surplus outer periphery of the separator which is adjacent to an electrode tab. The insulation-enhancing part may be an insulating coating layer or an insulating adhesive tape for coupling the surplus outer periphery of a separator to the outer surface of an electrode tab at the outer periphery of the separator which is adjacent to the electrode tab. The insulation-enhancing part may be an insulating coating layer or an insulating adhesive tape for coupling the outer peripheries of proximate separators to each other at the surplus outer peripheries thereof which are adjacent to the respective electrode tabs.

In other exemplary embodiments, the insulating coating layer or the insulating adhesive tape may be formed from an insulating material having a melting point in a range of about 150° C. to about 300° C. The insulating coating layer or the insulating adhesive tape may be formed from of an insulating material having an oxidation temperature in a range of about 150° C. to 300° C. The insulating coating layer or the insulating adhesive tape may have a thickness in a range of about 2 μm to about 60 mm. The insulating coating layer or the insulating adhesive tape may have a width in a range of about 10 μm to about 200 mm.

Additionally, the cathode tabs may protrude toward a first outer periphery that is a first end of the electrode assembly, and anode tabs may protrude toward a second outer periphery that is a second end of the first outer periphery. The cathode tabs and anode tabs may protrude together from the first outer periphery that is a first end of the electrode assembly.

In other exemplary embodiments, the insulation-enhancing part may be formed in the surplus outer peripheries of separators adjacent to cathode tabs or anode tabs. The insulation-enhancing part may be formed in each of the surplus outer peripheries of separators adjacent to cathode tabs and the surplus outer peripheries of separators adjacent to anode tabs. Additionally, a battery cell may include the electrode assembly.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Figure 1:
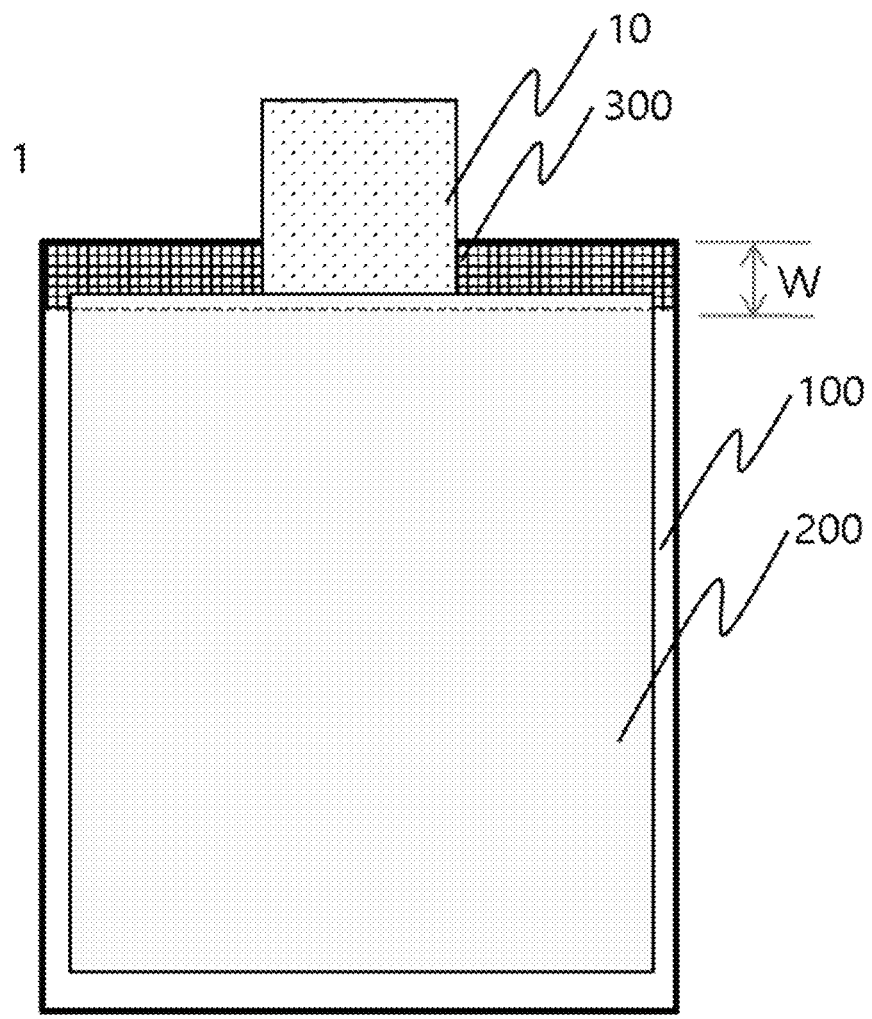
FIG. 1 is an exemplary schematic view of a structure in which a separator comprising an insulation-enhancing part in the outer periphery of the separator and an electrode plate comprising an electrode tab are stacked according to an exemplary embodiment of the present disclosure.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The exemplary embodiments of the present disclosure may include an insulation-enhancing part for suppressing heat shrinkage of a separator formed in the surplus outer peripheries of at least some of the separators forming the electrode assembly which are adjacent to the respective electrode tabs, and may prevent the separators from shrinking due to heat generation within the battery. Additionally, even when the separators shrink, the insulation-enhancing part may prevent contact between a cathode and an anode. Accordingly, the battery may be prevented from being short-circuited and thus may improve the safety of the battery Therefore, the electrode assembly according to an exemplary embodiment of the present disclosure is an electrode assembly that may include structure in which a plurality of electrode plates, one or both sides of each of which are coated with an electrode active material, are stacked with a separator interposed between the respective electrode plates. The separator may include a surplus outer periphery of a size greater than the outer periphery of an electrode plate, an electrode tab which extends from the outer periphery of the electrode plate and protrudes outwardly beyond the outer periphery of the separator may be formed on each electrode plate, and at least some of the separators forming the electrode assembly may have an insulation-enhancing part for suppressing heat shrinkage of a separator formed in the outer peripheries thereof which are adjacent to the respective electrode tabs.

Generally, when a separator end shrinks due to the reaction heat generated during abnormal operation of the battery, a cathode and an anode may contact with each other leading to a short circuit. In particular, in a stacked/folded type electrode assembly, a separator at the outer periphery adjacent to an electrode tab may shrink due to a large amount of heat generated from the electrode tab, through which an electric current passes during charging and discharging. When this region of a separator shrinks, the possibility of contact between electrode plates may increase due to the shape of the electrode tab protruding beyond the outer peripheries of the electrode plates and of the separator.

Accordingly, the electrode assembly according to the present disclosure may include the outer periphery of a separator may include a surplus outer periphery of a size greater than the outer periphery of an electrode plate, thereby preventing electrode plates having different polarities from contacting each other when the separator thermally shrinks. Further, in some exemplary embodiments of the separators, an insulation-enhancing part for suppressing heat shrinkage of a separator may be formed at the surplus outer periphery thereof which is adjacent to an electrode tab, thus greatly suppressing the shrinkage of the separators and thus more effectively preventing a battery short circuit.

In an exemplary embodiment, the insulation-enhancing part may be an insulating coating layer or an insulating adhesive tape for coupling the outer periphery of an electrode plate to the outer periphery of a separator at the surplus outer periphery of the separator which is adjacent to an electrode tab. More specifically, the insulation-enhancing part may be an insulating coating layer or an insulating adhesive tape for coupling the surplus outer periphery of a separator to the outer surface of an electrode tab at the outer periphery of the separator which is adjacent to the electrode tab. The insulation-enhancing part may be an insulating coating layer or an insulating adhesive tape for coupling the outer peripheries of proximate separators to each other at the surplus outer peripheries thereof which are adjacent to the respective electrode tabs. The addition of an insulation-enhancing part to an electrode assembly as described above may suppress heat shrinkage of a separator, thus may be capable of preventing an internal short circuit of the battery.

Furthermore, the structure of the present disclosure may be such that an insulation-enhancing part may be formed in the surplus outer peripheries of separators which are adjacent to cathode tabs or anode tabs. An insulation-enhancing may not be formed in all of the separators adjacent to cathode tabs and anode tabs. When an insulation-enhancing part is formed in the surplus outer peripheries of separators adjacent to cathode tabs or in the surplus outer peripheries of separators adjacent to anode tabs the heat shrinkage of the separators may be prevented. However, the heat shrinkage of separators may be prevented when an insulation-enhancing part is formed in the surplus outer peripheries of all the separators.

In an exemplary embodiment, the insulating coating layer or the insulating adhesive tape may be formed from of an insulating material having a melting point in the range of about 150 to about 300° C. Further, it may be formed from of an insulating material having an oxidation temperature in the range of about 150 to about 300° C. This is a temperature range that may be reached by the heat generated at the operating temperature range of the battery or during abnormal operation of the battery. Accordingly, the insulating coating layer or the insulating adhesive tape may have a bearing capacity or durability enough to prevent the heat shrinkage of the outer periphery of a separator and the outer periphery of an electrode plate or the heat shrinkage of the outer peripheries of separators.

The insulating coating layer or the insulating adhesive tape according to the present disclosure may have a thickness in the range of about 2 µm to about 60 mm, and may have a width in the range of about 10 µm to about 200 mm. When the thickness of the insulating coating layer or the insulating adhesive tape is less than 2 µm, the shrinkage of the separator may not be suppressed. When the thickness is greater than 60 mm, the thickness of the electrode assembly, may increase the internal resistance of the battery, and increases the volume of the final battery, resulting in a reduced energy density. When the width is less than 10 µm, the outer periphery of a separator and the outer periphery of an electrode plate may not be coupled together with an appropriate strength. When the width is greater than 200 mm, the internal resistance of the battery may increase.

In an exemplary embodiment, the electrode assembly according to the present disclosure may have a structure in which cathode tabs and anode tabs are disposed at opposite ends. Specifically, cathode tabs may protrude toward a first outer periphery which is a first end of the electrode assembly, and anode tabs may protrude toward a second outer periphery which is a second (e.g., the opposite) end of the first outer periphery.

In another exemplary embodiment, cathode tabs and anode tabs may protrude together from one end. In other words, cathode tabs and anode tabs may protrude from the first outer periphery which an end of the electrode assembly. The present disclosure also provides a battery cell that includes the above electrode assembly. The constitutions of the active material, binder, conductive agent, etc. constituting the electrode and of the electrolyte and other structures of the battery cell are well known in the art, and thus a detailed description thereof will be omitted herein.

Hereinafter, embodiments of the present disclosure will be described with reference to the drawings. However, these embodiments are provided to facilitate understanding of the present disclosure and the scope of the present disclosure is not limited thereto.

Figure 2:
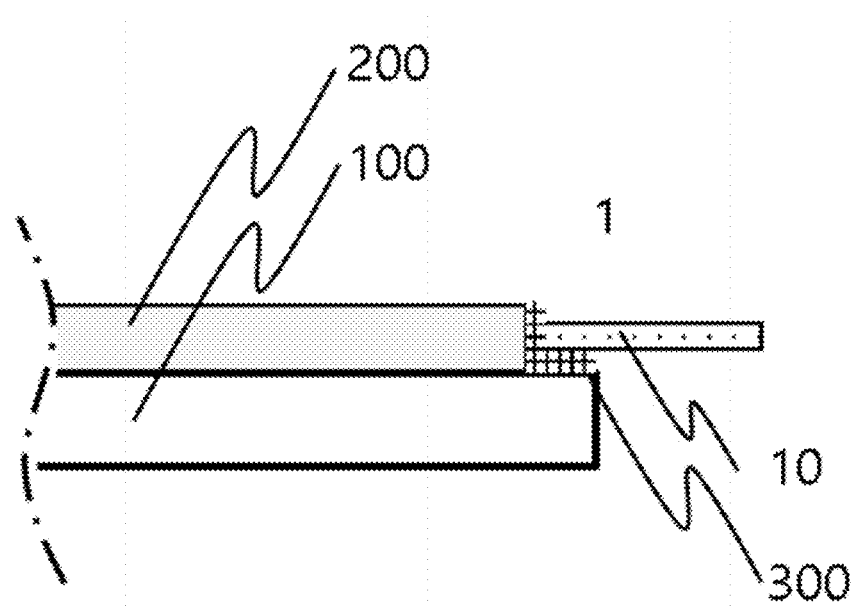
FIG. 2 is an exemplary vertical cross-sectional view of the stacked body of a separator and an electrode plate of FIG. 1 in the longitudinal direction of the electrode plate accordingly to an exemplary embodiment of the present disclosure.

FIG. 1 is an exemplary schematic view of a separator that may include an insulation-enhancing part at the surplus outer periphery of the separator and an electrode plate that may include an electrode tab according to the present disclosure. FIG. 2 is an exemplary vertical cross-sectional view of the stacked body of a separator and an electrode plate of FIG. 1 in the longitudinal direction of the electrode plate.

FIG. 1 and FIG. 2 show a separator 100 that may include a surplus outer periphery of a size greater than the outer periphery of an electrode plate 200. The electrode plate 200 may include an electrode tab 10 protruding beyond the surplus outer periphery of the separator 100. An insulation-enhancing part 300 having a width W may be formed in the outer periphery of the separator adjacent to the electrode tab 10 to couple the outer periphery of the electrode plate 200 and the surplus outer periphery of the separator 100 to each other.

Figure 3:
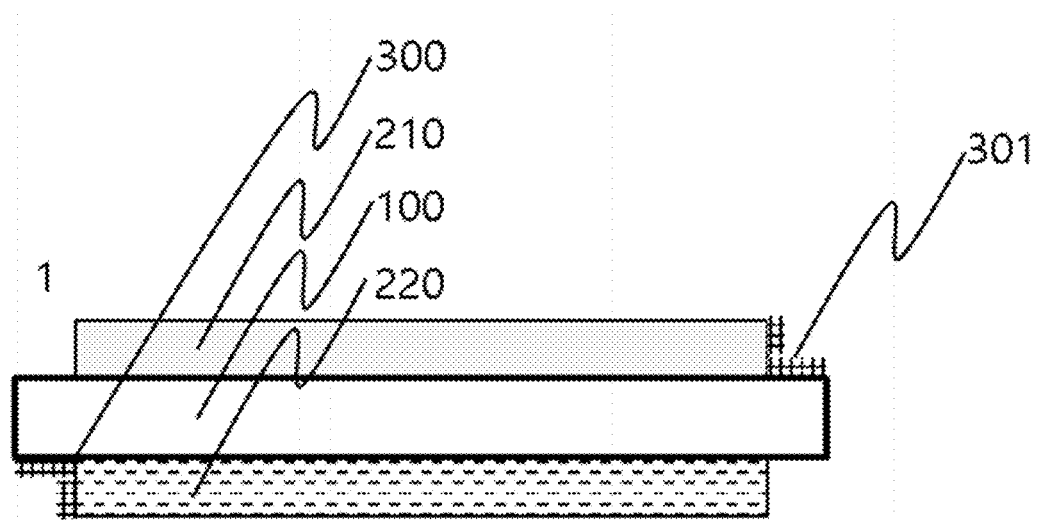
FIG. 3 is an exemplary vertical cross-sectional view of an electrode assembly according to an exemplary embodiment of the present disclosure.

FIG. 3 is an exemplary vertical cross-sectional view of an electrode assembly 1 according to an exemplary embodiment of the present disclosure. FIG. 3 shows an electrode assembly 1 in which a separator 100 may be interposed between a cathode plate 210 and an anode plate 220. Insulation-enhancing parts 300 and 301 may be formed in the surplus outer periphery of the separator 100. An insulation-enhancing part 301 may be formed in the surplus outer periphery of the separator 100 adjacent to the portion where a cathode tab (not shown) protrudes outwardly, and another insulation-enhancing part 300 may be formed in the surplus outer periphery of the separator 100 adjacent to the portion where an anode tab (not shown) protrudes outwardly. An insulation-enhancing part 300, 301 does not have to be formed on both sides of a separator 100. However, an insulation-enhancing part 300, 301 may be disposed on both sides of a separator 100 to more effectively prevent contact between a cathode plate 210 and an anode plate 220.

Specifically, the insulation-enhancing parts 300 and 301 disposed on both sides of the separator 100 may be coupled to the respective electrode plates. Thus, when the separator 100 is thermally shrunk due to an increase in the internal temperature of the battery, the electrode plates may not directly contact with each other and the separator 100 may be disposed against the electrode plates 210 and 220, which suppresses the shrinkage of the separator 100, thus preventing a short cut of the battery.

Figure 4:
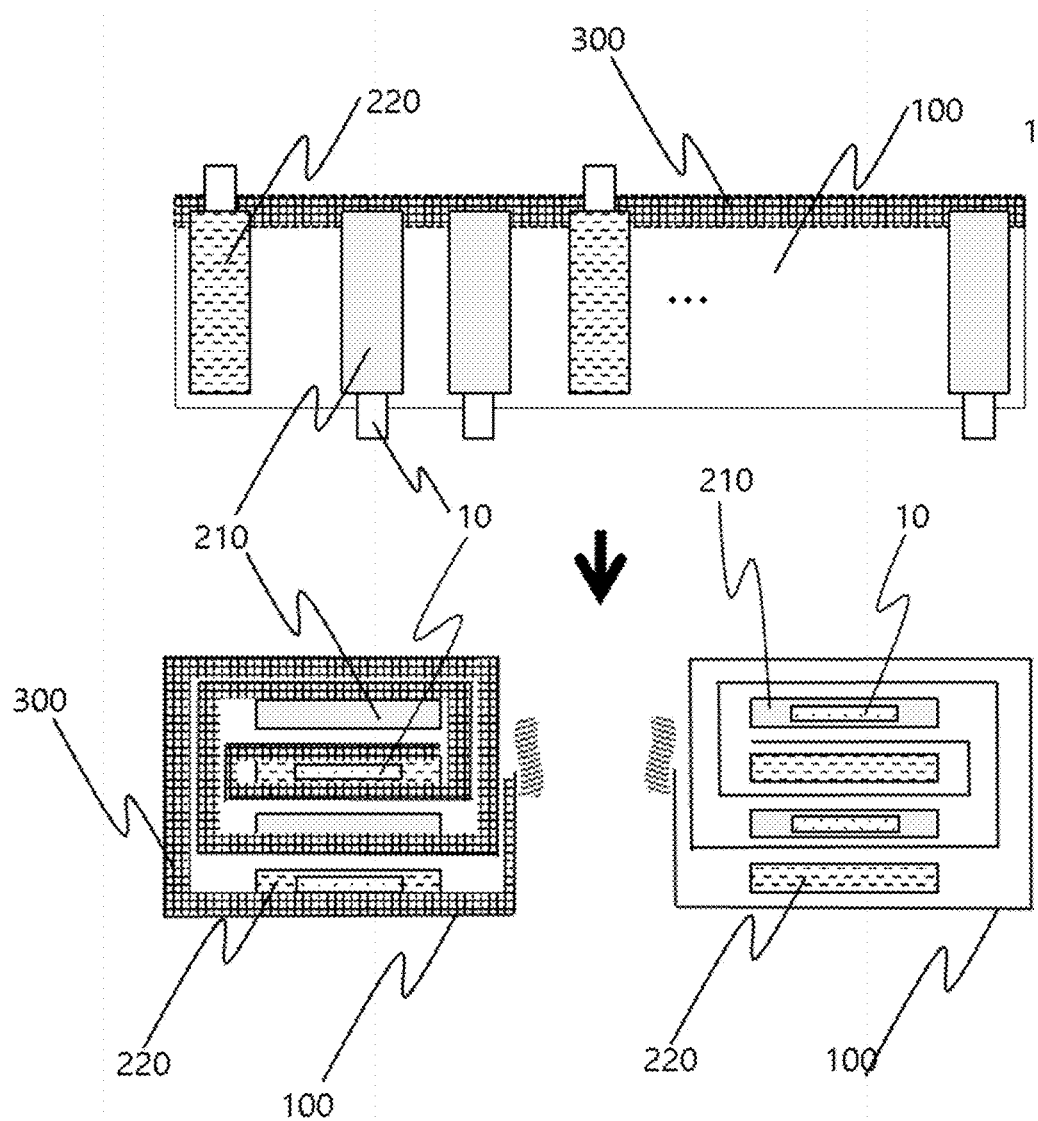
FIG. 4 is an side view of a stacked-folded type electrode assembly in which cathode plates and anode plates are wound with a separator sheet having an insulation-enhancing part formed therein according to an exemplary embodiment of the present disclosure.

FIG. 4 is an exemplary side view of a stacked-folded type electrode assembly in which cathode plates 210 and anode plates 220 are wound with one separator 100 sheet having an insulation-enhancing part 300 formed therein according to the present disclosure. FIG. 4 shows a separator 100 having an insulation-enhancing part 300 that may be formed in the surplus outer periphery of the separator 100 adjacent to an anode tab 10, and a cathode plate 210 and an anode plate 220 may be appropriately arranged to dispose the anode and the cathode to face each other in an electrode assembly 1 obtained by winding the separator 100. Referring to the side view of the electrode assembly obtained by winding the separator 100, an insulation-enhancing part 300 may be formed between the separator 100 and electrode plates 210, 220 when viewed from the side where an anode tab 10 protrudes, and the separator 100 and electrode plates 210, 220 may be shown from the side where a cathode tab 10 protrudes.

However, the electrode assembly 1 according to the present disclosure is not limited thereto, and may include the case where an insulation-enhancing part is formed on both of the surplus outer periphery of the separator adjacent to a cathode tab and the surplus outer periphery of the separator adjacent to an anode tab. In particular, since the separator is supported by a plurality of electrode plates, thermal shrinkage of the separator may be suppressed more effectively.

Figure 5:
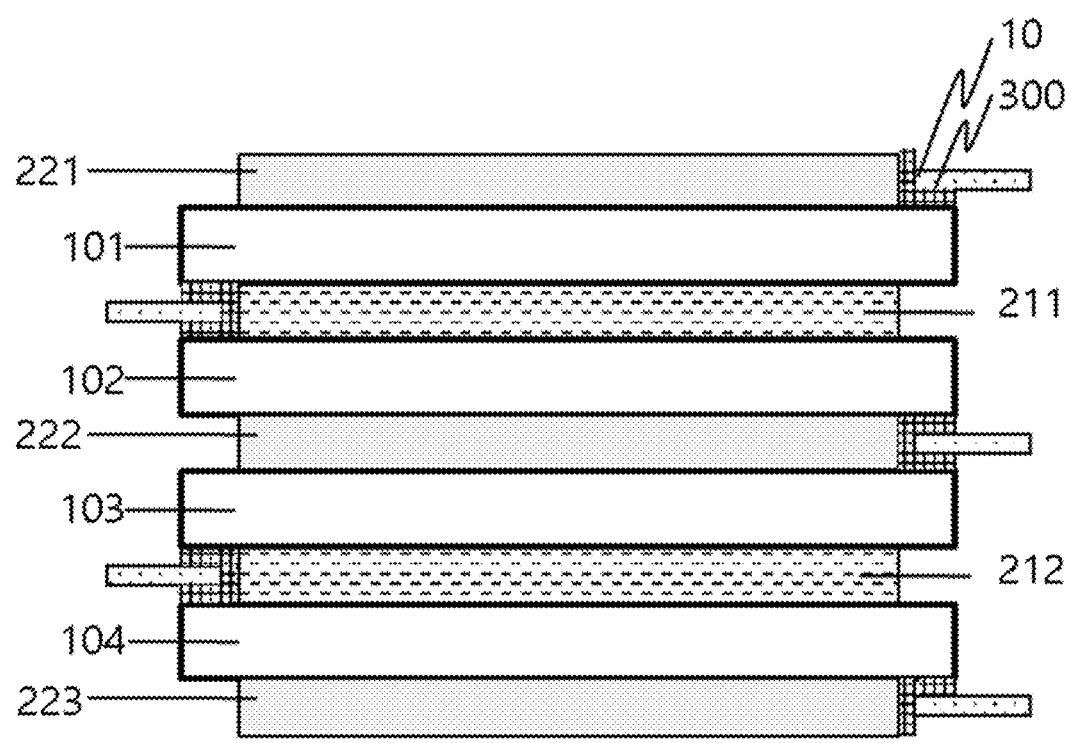
FIG. 5 is an exemplary vertical cross-sectional view of an electrode assembly according to an exemplary embodiment of the present disclosure.

FIG. 5 shows an electrode assembly in which cathodes 221, 222 and 223 and anodes 211 and 212 may be sequentially stacked and separators 101, 102, 103 and 104 may be interposed between the respective electrode plates. An insulation-enhancing part 10 may be formed on a first outer periphery, where a cathode tab protrudes, and an insulation-enhancing part may also formed on a second outer periphery, where an anode tab protrudes. An insulation-enhancing part may be formed on both sides of each separator to prevent shrinkage of the separator. Both sides of the separator may be coupled to electrode plates or a separator to suppress heat shrinkage of the separator.

As described above, the electrode assembly according to the present disclosure may include an insulation-enhancing part for suppressing the heat shrinkage of a separator, to prevent a separator from shrinking due to heat generation within the battery. Accordingly, even when a separator shrinks, the insulation-enhancing part may prevent contact between a cathode and an anode, thereby preventing a short circuit of the battery and thus further enhancing the safety of the battery.

While the present disclosure has been described with respect to the specific embodiments, it will be understood that those skilled in the art may make various changes and modifications without departing from the spirit and scope of the disclosure.

What is claimed is:

1. An electrode assembly, comprising:
   a plurality of electrode plates each having opposing major surfaces and a peripheral side between the opposing major surfaces, the plurality of electrode plates including a plurality of anode plates and a plurality of cathode plates coated with an electrode active material, the electrode plates being stacked with a separator interposed between adjacent anode and cathode plates, wherein the separator is of a size greater than the adjacent anode and cathode plates such that the separator includes a surplus outer periphery that extends beyond the peripheral side of the adjacent anode plate oriented in a first direction and beyond the peripheral side of the adjacent cathode plate oriented in the first direction;
   an electrode tab formed on each electrode plate to extend from the peripheral side of the electrode plate and protrude outwardly beyond the surplus outer periphery of the separator in the first direction; and
   an insulation-enhancing part disposed on the peripheral side of the electrode plate and on the surplus outer periphery of the separator such that the insulation-enhancing part extends to, but not beyond, an outermost peripheral edge of a portion of the separator in the first direction in which the electrode tab protrudes,
   wherein the insulation-enhancing part suppresses heat shrinkage of the separator, and
   wherein the electrode assembly is a stacked type electrode assembly.

2. The electrode assembly according to claim 1, wherein the insulation- enhancing part is an insulating coating layer or an insulating adhesive tape for coupling the peripheral side of the electrode plate to the separator at the surplus outer periphery of the separator which is adjacent to the electrode tab.

3. The electrode assembly according to claim 1, wherein the insulation-enhancing part is an insulating coating layer or an insulating adhesive tape for coupling the surplus outer periphery of the separator to a peripheral edge of the electrode tab at the surplus outer periphery of the separator which is adjacent to the electrode tab.

4. The electrode assembly according to claim 1 , wherein the insulation-enhancing part is an insulating coating layer or an insulating adhesive tape for coupling the outer peripheries of adjacent separators to each other at the surplus outer peripheries thereof which are adjacent to the respective electrode tabs.

5. The electrode assembly according to claim 2, wherein the insulating coating layer or the insulating adhesive tape is formed from an insulating material having a melting point in a range of about 150° C. to about 300° C.

6. The electrode assembly according to claim 2, wherein the insulating coating layer or the insulating adhesive tape is formed from of an insulating material having an oxidation temperature in a range of about 150° C. to about 300° C.

7. The electrode assembly according to claim 2, wherein the insulating coating layer or the insulating adhesive tape has a thickness in a range of about 2 μm to about 60 mm.

8. The electrode assembly according to claim 2, wherein the insulating coating layer or the insulating adhesive tape has a width in a range of about 10 μm to about 200 mm.

9. The electrode assembly according to claim 1, wherein cathode tabs protrude from a first peripheral side that is at a first end of the electrode assembly, and anode tabs protrude from a second peripheral side that is at a second end of the electrode assembly opposite the first end.

10. The electrode assembly according to claim 1, wherein cathode tabs and anode tabs protrude together a first peripheral side that is at a first end of the electrode assembly.

11. The electrode assembly according to claim 9, wherein the insulation-enhancing part is formed in the surplus outer peripheries of separators adjacent to the cathode tabs or the anode tabs.

12. The electrode assembly according to claim 9, wherein the insulation-enhancing part is formed in each of the surplus outer peripheries of separators adjacent to the cathode tabs and the surplus outer peripheries of separators adjacent to the anode tabs.

13. A battery cell comprising the electrode assembly according to claim 1.

14. The electrode assembly according to claim 10, wherein the insulation-enhancing part is formed in the surplus outer peripheries of separators adjacent to the cathode tabs or the anode tabs.

15. The electrode assembly according to claim 10, wherein the insulation-enhancing part is formed in each of the surplus outer peripheries of separators adjacent to the cathode tabs and the surplus outer peripheries of separators adjacent to the anode tabs.

16. The electrode assembly according to claim 3, wherein the insulating coating layer or the insulating adhesive tape is formed from an insulating material having a melting point in a range of about 150° C. to about 300° C.

17. The electrode assembly according to claim 4, wherein the insulating coating layer or the insulating adhesive tape is formed from an insulating material having a melting point in a range of about 150° C. to about 300° C.

18. The electrode assembly according to claim 3, wherein the insulating coating layer or the insulating adhesive tape is formed from of an insulating material having an oxidation temperature in a range of about 150° C. to 300° C.

19. The electrode assembly according to claim 4, wherein the insulating coating layer or the insulating adhesive tape is formed from of an insulating material having an oxidation temperature in a range of about 150° C. to 300° C.

20. The electrode assembly according to claim 3, wherein the insulating coating layer or the insulating adhesive tape has a thickness in a range of about 2 μm to about 60 mm.

* * * * *